United States Patent [19]

Inasawa et al.

[11] 4,349,214
[45] Sep. 14, 1982

[54] KNEE PROTECTOR

[75] Inventors: Hideho Inasawa; Hideoki Matsuoka, both of Yokohama, Japan

[73] Assignee: Nissan Motor Company, Limited, Yokohama, Japan

[21] Appl. No.: 118,824

[22] Filed: Feb. 5, 1980

[30] Foreign Application Priority Data

Feb. 21, 1979 [JP] Japan .................. 54-22207[U]

[51] Int. Cl.³ .................................. B60R 21/04
[52] U.S. Cl. ........................ 280/752; 180/90; 280/750
[58] Field of Search ............ 280/750, 751, 752, 753, 280/748; 296/70-74; 180/90; 74/492

[56] References Cited

U.S. PATENT DOCUMENTS

| 3,888,506 | 6/1975 | Haas | 280/751 |
| 3,897,848 | 8/1975 | Arnstson et al. | 280/752 |
| 3,930,665 | 1/1976 | Ikawa | 280/751 |
| 3,979,139 | 9/1976 | Hoffmann | 280/751 |
| 4,197,762 | 3/1980 | Sudo | 280/751 |

FOREIGN PATENT DOCUMENTS 52-24896  7/1977  Japan .

Primary Examiner—Joseph F. Peters, Jr.
Assistant Examiner—Donald W. Underwood
Attorney, Agent, or Firm—James C. Wray

[57] ABSTRACT

A knee protector for use in a passenger car equipped with an instrument panel and a steering column installed near the instrument panel, comprises a first and second panels which are separate to each other. The steering column is positioned between the first and second panels. The first and second panels are attached under the instrument panel. A pad covering the first and second panels. The pad has a convex portion to be inserted into a space between the first and second panels.

6 Claims, 3 Drawing Figures

KNEE PROTECTOR

BACKGROUND OF THE INVENTION

The present invention relates to a knee protector for use in a passenger car.

There are two types of knee protectors for use in a passenger car. In one type knee protector, a single panel is fixed to both dash side panels at the front side of the passenger room. In the other type knee protector, two separate panels are arranged in such a way that a steering column is positioned therebetween.

As well known in the art, the knee protector is to absorb the shock energy of the passenger against the steering column and other parts at the accident. However, in the conventional single panel type knee protector, the knee protector becomes directly in contact with the steering protector almost simultaneously when the car body is shocked. Thereafter the knee protector does not deform reasonably. As a result, the load occuring on the femoral region of the passenger increases so that he is often seriously injured.

In the two-panel type knee protector, the knees of the passenger do not hit agaist a predetermined portion. For example, when the car is obliquely shocked, the knee of the passenger may come to a portion which is not covered with the panel. In such a case, the knee of the passenger hits against the steering column directly so that it is apt to be seriously injured.

SUMMARY OF THE INVENTION

Therefore, it is an object of the present invention to provide a knee protector for use in a passenger car in which the knees of a passenger can be effectively protected in view of the foregoing defects of the prior art. Another object of the present invention is to provide a knee protector in which its production cost is low.

According to the present invention, a knee protector for use in a passenger car comprises a first and second panels which are attached under an instrument panel. A steering column is positioned between the first and second panels. A pad covers the first and the second panels from the outside thereof. The pad has a convex portion on the backside thereof which is inserted into a space between the first and second panels. It is preferable that the convex portion of the pad extends to come near or contact the steering column when the pad is arranged in position.

BRIEF DESCRIPTION OF THE DRAWINGS

These and other objects, features and advantages of the present invention will become more apparent from the following description of the preferred embodiment thereof when read in conjunction with the accompanying drawings in which.

DETAILED DESCRIPTION OF THE PREFERRED EMBODIMENT

Figure 1:
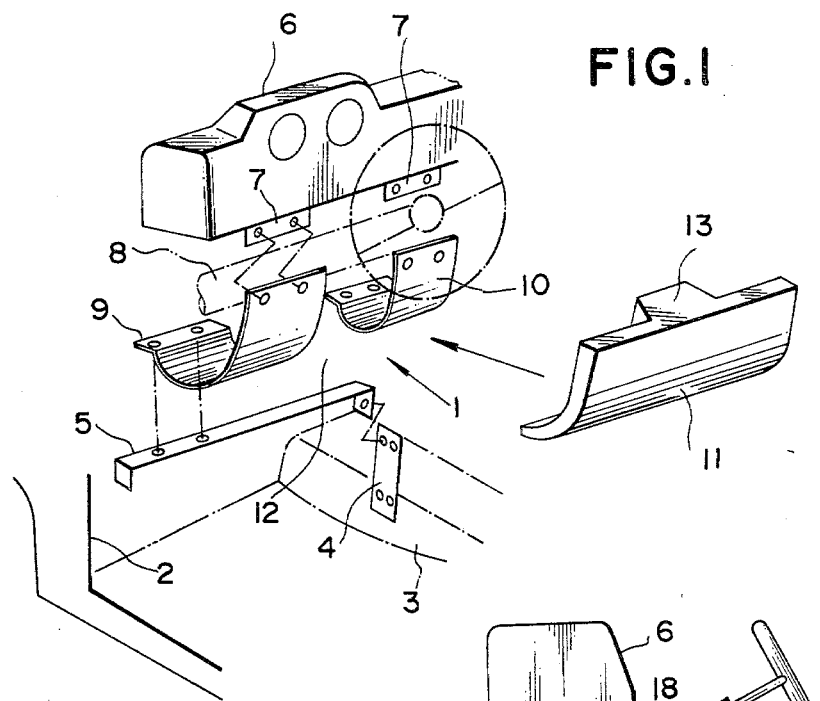
FIG. 1 is a perspective disassembled view showing the front portion of a passenger car equiped with a knee protector according to the present invention.
Figure 2:
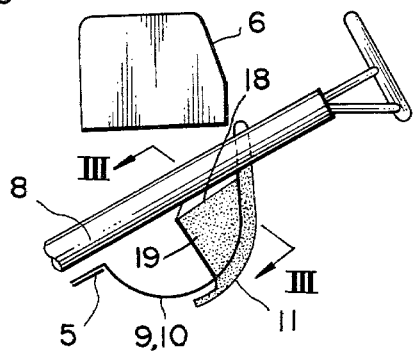
FIG. 2 is a sectional view showing the knee protector and other related parts in an assembled form.
Figure 3:
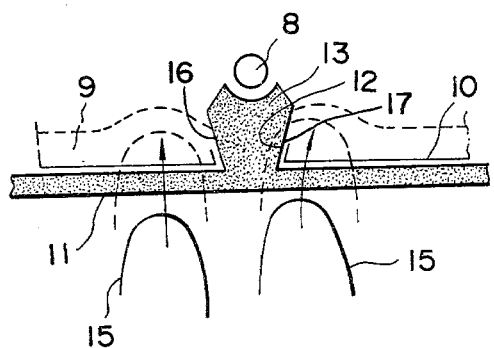
FIG. 3 is a section taken along the line III—III in FIG. 2.

Referring now to FIGS. 1 through 3, the numeral 1 denotes generally a knee protector according to the present invention. The knee protector 1 includes a first and second panel 9, 10 which are curved and relatively thin in a preferred form. The respective lower portions of the first and second panels 9, 10 are to be attached onto a fitting member 5 extending horizontally from a dash side portion 2 to a stay of a tunnel portion 4 at the front side of the passenger room. The upper portions of the first and second panels 9, 10 are to be attached onto corresponding brakets 7 of an instrument panel 6. The brakets 7 extend downwards from the underside of the instrument panel 6.

The knee protector 1 includes a pad 11 which is designed to cover the upper portion of both first and second panels 9, 10 from the outside thereof. It is preferable that the inner surface of the pad 11 corresponds in figure to the outer surface of the first and second panels 9, 10 as shown best in FIG. 2 in order to increase the efficiency of supporting the panels 9, 10. The pad 11 has a convex portion 13 on the backside thereof which is to be inserted into a space 12 between the first and second panels 9, 10 as shown best in FIG. 13. The convex portion 13 of the pad 11 extends to a steering column 8 positioned between the first and second panels 9, 10 so as to come close to or in contact with the underside of the steering column 8 when the pad 11 is arranged in position. The convex portion 13 of the pad 11 is preferably thick as compared with the diameter of the steering column 8 and has a small concave portion or groove along the upper edge thereof in parallel to the steering column 8. The convex portion further has side walls 16 and 17 which diverge toward the steering column 8 and upper and lower walls 18 and 19 which converge toward the steering column 8.

The pad 11 is made of such a material as can absorb the shock by the deforming of the pad 11. Therefore, if knees 15 of a passenger hit against the pad 11 when the car is obliquely shocked, the load occuring at the femoral region of the passenger is effectively absorbed by the pad 11 before the knee comes near the steering column 8, as shown by the dotted line in FIG. 3.

The panels 9, 10 are made of such a material as can be easily crushed as compared with the steering column 8. Therefore, the knee of the passenger is apt to crush the panels 9, 10 prior to the steering column 8 so that it can move out of the steering column 8 as shown by the dotted line in FIG. 3. Thus, a serious injury can be avoided.

According to the present invention, the knees of the passenger push the pad and first the convex portion of the pad contact the steering column. Thereafter the convex portion of the pad is crushed. As the crushing of the convex portion of the pad proceeds, the shock energy is gradually absorbed as the result of such crushing of the convex portion. Finally the pad 11 and the panels 9, 10 are crushed if the shock energy is large.

Consequently, no heavy load is given onto the knees of the passenger. This is more remarkable in case the lower portion of the pad is tapered in a vertical direction.

Also, the production cost of the knee protector is low as compared with the prior art.

What is claimed is:

1. A knee protector for use in a passenger car equipped with an instrument panel and a steering colum installed near the instrument panel, comprising first and second curved panels made of material easily crushed as compared with the steering column, the first and second panels being independent and separate to each other, the steering column being aligned with a space between the first and second panels, the first and second panels being mounted under the instrument panel, and a pad made of material that absorbs shock by deformation of the pad, the pad having a pair of side portions covering the upper portion of the first and second panels, the pad having a center portion protruding through said space and extending downwardly along the underside of the portion of the steering column behind the first and second panels in a manner that, in the event of collision, the center portion of the pad first abuts against the steering column and both the first and second panels are deformed while remaining separate from the steering column so that the knees of a driver are guided by the pad and move toward the first and second panels and away from the steering column, said center portion of the pad having diverging side walls and converging upper and lower walls, the upper wall being positioned closely adjacent the steering column when the pad is arranged in position.

2. A knee protector as defined in claim 1 wherein the pad is tapered.

3. A knee protector as defined in claim 1 wherein the inner surface of the pad corresponds to the upper portion of the outer curved surface of the first and second panels.

4. A knee protector as defined in claim 1 wherein the center portion of the pad is formed of material which absorbs shock by deforming in such a manner that the center portion contacts the steering column at the accident and is crushed gradually before the other parts of the pad contact the steering column.

5. A knee protector as defined in claim 1 wherein the center portion of the pad is relatively thick as compared with the diameter of the steering column.

6. A knee protector as defined in claim 5 wherein the center portion of the pad has on its upper edge a small concave portion along the steering column.

* * * * *